US008171293B2

(12) United States Patent
Sudhakar

(10) Patent No.: US 8,171,293 B2
(45) Date of Patent: May 1, 2012

(54) RECEIVER NON-REPUDIATION VIA A SECURE DEVICE

(75) Inventor: Gosukonda Naga Venkata Satya Sudhakar, Bangalore (IN)

(73) Assignee: Apple Inc., Cupertino, CA (US)

( * ) Notice: Subject to any disclaimer, the term of this patent is extended or adjusted under 35 U.S.C. 154(b) by 1046 days.

(21) Appl. No.: 11/430,454

(22) Filed: May 9, 2006

(65) Prior Publication Data
US 2007/0160203 A1    Jul. 12, 2007

(30) Foreign Application Priority Data
Dec. 30, 2005 (IN) .......................... 3543/DEL/2005

(51) Int. Cl.
*H04L 9/32* (2006.01)
*H04L 9/08* (2006.01)
*G06F 12/14* (2006.01)

(52) U.S. Cl. ........ 713/173; 713/168; 713/171; 713/176; 713/164; 380/282

(58) Field of Classification Search .................. 713/194, 713/173
See application file for complete search history.

(56) References Cited

U.S. PATENT DOCUMENTS

| 5,226,079 | A | | 7/1993 | Holloway |
|---|---|---|---|---|
| 5,710,816 | A | | 1/1998 | Stork et al. |
| 5,790,669 | A | | 8/1998 | Miller et al. |
| 5,892,900 | A | * | 4/1999 | Ginter et al. .................... 726/26 |
| 6,044,463 | A | | 3/2000 | Kanda et al. |
| 6,119,179 | A | | 9/2000 | Whitridge et al. |
| 6,134,326 | A | * | 10/2000 | Micali .............................. 380/30 |
| 6,158,003 | A | | 12/2000 | Kara |
| 6,336,105 | B1 | | 1/2002 | Conklin et al. |
| 6,470,448 | B1 | * | 10/2002 | Kuroda et al. ................. 713/176 |
| 6,510,513 | B1 | | 1/2003 | Danieli |
| 6,532,543 | B1 | | 3/2003 | Smith et al. |
| 6,904,521 | B1 | | 6/2005 | Jivsov |
| 6,963,974 | B1 | | 11/2005 | Skinner et al. |
| 6,973,545 | B2 | | 12/2005 | Cypher |
| 7,016,089 | B2 | | 3/2006 | Yoneda et al. |
| 7,142,676 | B1 | * | 11/2006 | Hillier et al. ................... 380/278 |
| 7,185,047 | B1 | | 2/2007 | Bate et al. |

(Continued)

FOREIGN PATENT DOCUMENTS
WO    WO-0125883    4/2001

OTHER PUBLICATIONS

Alireza Bahreman, L D. Tygar: Certified Electronic Mail; Prec. Symposium on Network and Distributed Systems Security, Internet Society, Feb. 1994, 3-19.*

(Continued)

*Primary Examiner* — Matthew Henning
(74) *Attorney, Agent, or Firm* — Schwegman, Lundberg & Woessner, P.A.

(57) ABSTRACT

Techniques for assuring a receiver's non repudiation of a communication are provided via cooperation with a secure device. A secure device operates within a local environment of a receiver and exchanges certificates with a sender via the receiver. The sender encrypts data in a communication with the receiver. Separately, the sender sends an encrypted version of a decryption key to the receiver. The receiver presents the encrypted version of the key to the secure device and the secure device supplies the decryption key for use by the receiver to decrypt the previously sent encrypted data.

29 Claims, 3 Drawing Sheets

U.S. PATENT DOCUMENTS

| | | | |
|---|---|---|---|
| 7,203,709 B2 | 4/2007 | Long et al. | |
| 7,298,851 B1 | 11/2007 | Hendricks et al. | |
| 7,353,204 B2* | 4/2008 | Liu | 705/50 |
| 7,434,048 B1 | 10/2008 | Shapiro et al. | |
| 7,840,813 B2 | 11/2010 | Canard et al. | |
| 7,890,757 B2 | 2/2011 | Sudhakar | |
| 2001/0025311 A1 | 9/2001 | Arai et al. | |
| 2001/0037453 A1 | 11/2001 | Mitty et al. | |
| 2002/0004902 A1 | 1/2002 | Toh et al. | |
| 2002/0143710 A1* | 10/2002 | Liu | 705/75 |
| 2002/0194470 A1 | 12/2002 | Grupe | |
| 2003/0046533 A1* | 3/2003 | Olkin et al. | 713/152 |
| 2003/0084003 A1* | 5/2003 | Pinkas et al. | 705/71 |
| 2003/0126464 A1 | 7/2003 | McDaniel et al. | |
| 2004/0078567 A1 | 4/2004 | Newbould | |
| 2004/0215964 A1* | 10/2004 | Barlow et al. | 713/172 |
| 2005/0021973 A1 | 1/2005 | Chen et al. | |
| 2005/0039031 A1* | 2/2005 | Mont et al. | 713/189 |
| 2005/0076210 A1 | 4/2005 | Thomas et al. | |
| 2005/0169479 A1 | 8/2005 | Ekstrom | |
| 2005/0251691 A1 | 11/2005 | Haufe | |
| 2006/0242068 A1 | 10/2006 | Jogand et al. | |
| 2007/0157031 A1 | 7/2007 | Sudhakar | |
| 2008/0214300 A1 | 9/2008 | Williams et al. | |
| 2009/0319797 A1 | 12/2009 | Tornqvist | |
| 2010/0125893 A1 | 5/2010 | Kumar et al. | |
| 2010/0135497 A1 | 6/2010 | Sudhakar et al. | |
| 2011/0185170 A1 | 7/2011 | Sudhakar | |

OTHER PUBLICATIONS

Boudaoud, K., "Nrpp: A new solution to prove the receipt of an electronic document", *Proc. of the 10th HP Openview University Association Plenary Workshop*—HPOVUA'2003, Geneva, Switzerland, (Jul. 6-9, 2003), 1-3.

Tak, Sung W., et al., "A Software Framework for Non-repudiation Service in Electronic Commerce based on the Internet", *Information Systems Frontiers*, 6(1), (2004),47-66.

"IBM Tivoli Directory Server tuning", http://publib.boulder.ibm.com/infocenter/tivihelp/v2r1/index.jsp?topic=/com.ibm.IBMDS.doc/tuning05.htm, Directory Server, Version 6.1, (Downloaded Sep. 15, 2008).

Bo, M, et al., "A fair non-repudiation protocol", Computer Supported Cooperative Work in Design, The 7th International Conference on, (2002), 68-73.

* cited by examiner

RECEIVER NON-REPUDIATION VIA A SECURE DEVICE

RELATED APPLICATION

The present application claims priority to India Patent Application No. 3543/DEL/2005 filed in the India Patent Office on Dec. 30, 2005 and entitled "Perfect Non-Repudiation of Receiver with Secure Hardware," the disclosure of which is incorporated by reference herein.

1. Field

The invention relates generally to network security and more particularly to techniques for assuring receiver non-repudiation of electronic communications over a network with the aid of a secure device.

2. Background

Some types of electronic communications are time-sensitive or transaction-sensitive. For example, a bank may receive a transfer of funds request from a depositor. In another case, a broker may receive a buy or sell order from an online trader. Sensitive and valued communications are not limited to pending financial transactions. As another example, consider a broker that may send time-sensitive investment advice to a trader.

One unique aspect about time or transaction-sensitive communications is that they typically track, log, and employ a variety of security measures. Thus, two parties that engage in such types of communications may use encryption, may use a secure communication channel (e.g., Secure Sockets Layer (SSL), etc.), may enlist the services of a third party, and may require acknowledgments during the communications.

Yet, in any communication there is a chance for repudiation by one of the parties. That is, one of the parties may assert that it did not receive information to complete the communication, that it received information in an untimely fashion, or that it received the incorrect information necessary to complete the communication. In some cases the repudiation may be legitimate, and in other cases the repudiation may simply be the result of a receiver that does not want to complete a transaction associated with the communication.

To account for these potential problems many techniques require acknowledgements using signatures for purposes of assuring that the proper information, which was sent, is being acknowledged by a receiving party. This technique facilitates what is known as receiver non-repudiation.

However, even the most elaborate software technique may still encounter problems that are not capable of being handled with a purely software-based solution. For instance, consider a hostile environment where some intruder places him/herself in the middle of a communication between a sender and a receiver. The intruder may be purposefully modifying the last packet sent, which makes the receiver unable to extract and utilize the last packet. Also suppose that the last packet is a decryption key without which the receiver cannot complete the communication with the sender.

The intruder may continue to do this until the value of the information, which may be time sensitive, is useless or becomes expired and then the intruder may disappear undetected. A software-based solution cannot properly account for this situation. Most existing software protocols assume that the receiver had received the last packet and it will be generally assumed that it is the receiver that is the culprit attempting to surreptitiously repudiate the transaction with the sender.

A software-based solution may not be capable of solving this man-in-the-middle problem. The last packet is central to the transaction and its delivery to the receiver cannot be guaranteed. This is especially the case in an environment where there is more than zero number of network hops between the receiver and the sender or third party providing the last packet.

Another problem that may not be generally detectable by a software-based solution is when a genuine power failure, system crash, communication line failure, or other situations occur on the receiver's end of the transaction. It can also be the case that the recovery for the problem is not established until after the information associated with the transaction becomes expired or useless. In these cases and perhaps pursuant to prior agreements between the sender and receiver, the receiver may be charged for the transaction or forced to complete it at the receiver's expense, since the problem occurred on the receiver's end.

Furthermore, if the sender and receiver elect to not use a third party to facilitate the transaction, then it may be even more difficult to establish a non-repudiation of the receiver when problems occur. In fact, if the value of the message associated with the transaction is high and it is also time sensitive in nature, then without more robust techniques beyond a purely software-based solution there is also a chance that the receiver may suffer a potentially substantial loss.

Therefore, improved techniques that augment existing software techniques are desirable for purposes of ensuring non-repudiation of a receiver in a time or transaction-sensitive network communication.

SUMMARY

In various embodiments, techniques are provided for assuring a receiver does not repudiate an electronic communication by incorporating a secure device in that communication. More particularly and in an embodiment, certificates are exchanged with a sender via a receiver. The sender and the receiver are to engage in a communication with one another. An exchange date and time is recorded for the exchange took place with the sender. Next, a decrypted version of an encrypted key is supplied to the receiver, if the receiver presents the encrypted key. The receiver uses the decrypted version of the encrypted key to complete the communication by decrypting data that had been encrypted within the communication.

DETAILED DESCRIPTION

Figure 1:
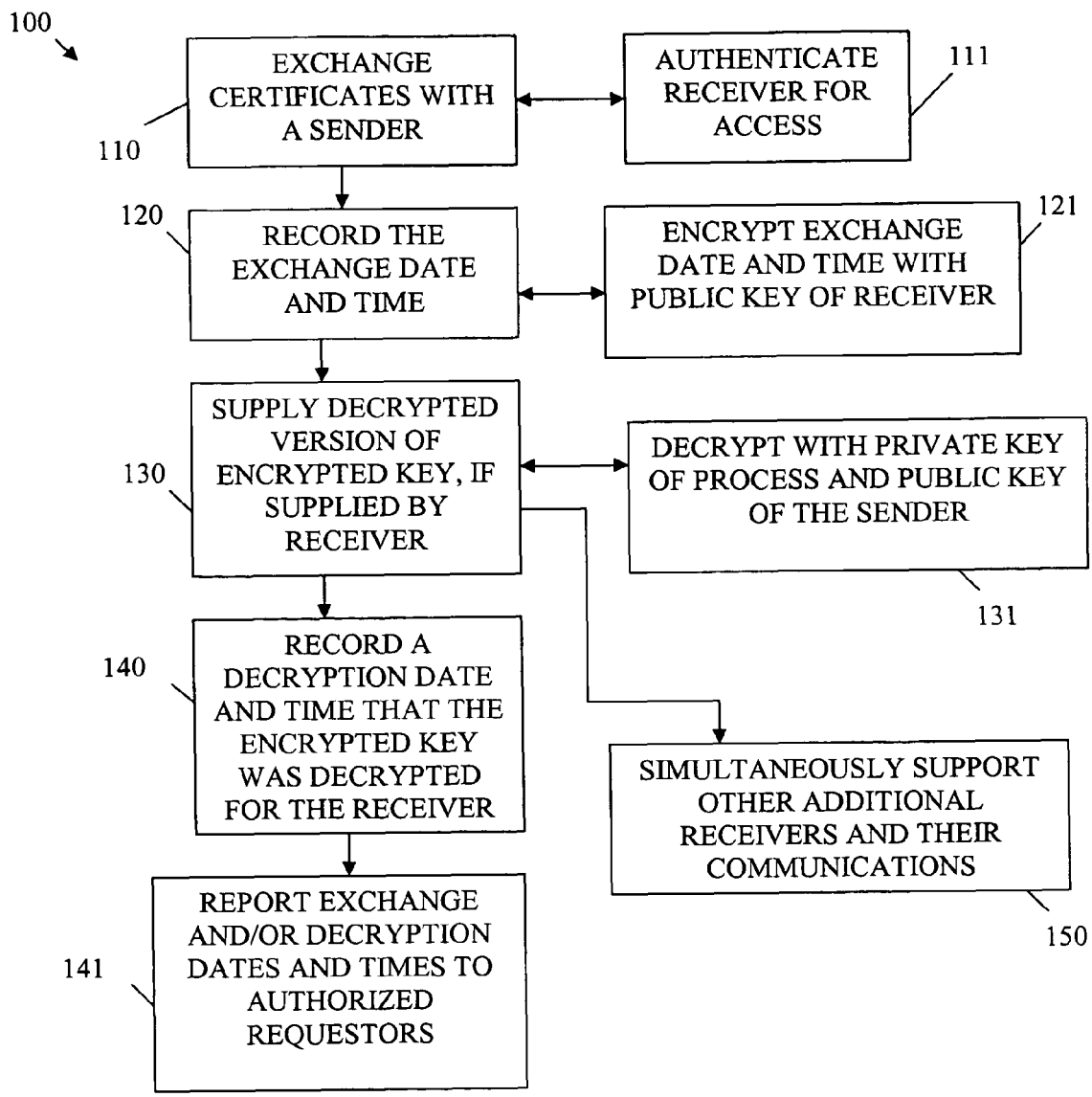
FIG. 1 is a diagram of a method for a secure device that facilitates receiver non-repudiation in a communication between a sender and receiver, according to an example embodiment.

A "communication" is a transaction or session engaged in over a network by a sender and a receiver. The communication may entail one or more interactions between the sender and receiver during that session.

A "sender" and a "receiver" are resources engaged in a communication with one another over the network. The designation as to what is a sender and what is a receiver may change depending upon the role a party is playing in a communication. So, for one communication a party may be designated a sender and for another communication the same party may be designated a receiver.

A "resource" is includes an end-user, a service, an application, a system, or a device. A resource may be viewed as a logical or a physical entity represented within a machine-accessible medium. Accordingly, a resource includes a service and may also include a device or machine (e.g., printer, computer, intelligent apparel, intelligent appliance, phone, laptop, personal digital assistant (PDA) tablet personal computer (PC), network switch, universal serial bus (USB) device, hub, bridge, router, etc.). A resource may also include a user of a device or machine, a directory, or a data store (e.g., database, electronic file, data warehouse, etc.).

A "key" is electronic data that is used to encrypt and decrypt data. According to an embodiment, multiple keys are used to encrypt and decrypt a piece of data associated with a communication. For example, public and private key pairs may be used to perform encryption and decryption. In such a case, a private key of an encrypting/decrypting party is combined with a public key of a decrypting/encrypting party's public key to perform encryption and decryption.

A "certificate" is a credential, which may be issued by a certificate authority that includes a variety of information about the certificate holder, such as but not necessarily limited to, a name, a serial number, an expiration date, the holder's public key, a digital signature of the certificate authority that issued the certificate, etc.

A "signature" may be viewed as data that is used to verify other data or resources. In some cases, a signature may be a hash of a variety of different information. For example, a signature may include a hash of a message and an identity of a sending resource associated with the message. A signature may be temporary for a given portion of a communication or it may be persistent for a given resource.

Various embodiments of this invention can be implemented in existing resource or machine architectures as enhancements. For example, in some embodiments, the techniques presented herein are implemented in whole or in part in a portable and removable USB device.

Of course, the embodiments of the invention can be implemented in a variety of architectural platforms, devices, machines, operating and server systems, or applications. Any particular device, architectural layout or implementation presented herein is provided for purposes of illustration and comprehension only and is not intended to limit embodiments of the invention.

FIG. 1 is a diagram of a method 100 for a secure device that facilitates receiver non-repudiation in a communication between a sender and receiver, according to an example embodiment. The method 100 (hereinafter "secure device service") is implemented in a machine-access and machine-readable medium and is accessible over a network. The network may be wired, wireless, or a combination of wired and wireless.

Initially, there are three resources that are preconfigured to interact with one another in a communication or transaction. The primary communication occurs between a sender and a receiver over a network. A third resource, the secure device service is situated within the local environment of the receiver and participates in the manners discussed herein for purposes of facilitating receiver no-repudiation of that communication.

The secure device service may be implemented within a variety of secure devices. For example, the secure device may be a removable and portable USB device that the receiver interfaces to its server or machine. Alternatively, the secure device service may be a fixed device interfaced to either the receiver's machine or a proxy or server associated with the receiver's local networked environment.

The device or machine that includes the instructions for processing the secure device service is tamper resistant. In some cases, it includes a private key that when provided grants administrative access to the device. The private key may be prefabricated within the device by a manufacturer.

According to another embodiment, the device or machine that includes the instructions for processing the secure device service is disposable. This means that when the memory or storage of the device is completely used, the device may be disposed of. In other cases a super user or administrator may clear memory or storage when the memory or storage becomes full.

At 110, the secure device service exchanges certificates with a sender of a communication. This is achieved via the receiver, since the receiver directly communicates over the network with the sender and the secure device service may just interact directly with the receiver. According to an embodiment, at 111, the secure device service may first authenticate the receiver for access via a password, biometrics, or other technique before the receiver is permitted to enlist the services of the secure device service.

Using the receiver, the sender and the secure device service exchange certificates with one another, this permits both the sender and the secure device service to establish a relationship with each other through the receiver for a communication of the sender to the receiver.

At 120, the secure device service records an exchange date and time for when the certificates were exchanged. The sender exchanges the certificates just before it engages in a communication with the receiver. So, the secure device service may use the date and time of the exchange of certificates as a rough estimate as to when the sender began a communication with the receiver.

In an embodiment, at 121, and for added security, the exchange date and time and other metrics, which may be gathered by the secure device service, may be encrypted within memory or storage of the device or machine that processes the secure device service. For example, a public key of the receiver may be used in combination with the private key of the secure device service to encrypt the exchange date and time. Thus, the receiver and the secure device service may also exchange certificates with one another when the receiver first authenticates to the secure device service. In this manner, the communications between the receiver and the secure device service may also be encrypted.

After the secure device service exchanges certificates with the sender, the secure device service waits to hear from the receiver. That is, the sender and the receiver engage in their communication with one another independent of the secure device service until the receiver wants to complete the communication and requests a decryption key to decrypt data received during the communication with the sender. The sender supplies a decryption key in an encrypted format. The encrypted format cannot be decrypted by the receiver without first enlisting the assistance of the secure device service.

So, the sender transmits an encrypted decryption key to the receiver. In response to that transmission, the receiver makes a request of the secure device service to decrypt the encrypted key on its behalf.

A variety of circumstances may occur before a receiver makes a request for the encrypted key to be decrypted, such that the secure device service may never actually receive a request from the receiver to perform the decryption. Assuming, a request is received from the receiver, then, at 130, the secure device service decrypts the encrypted key and supplies the key to the receiver. The receiver cannot any longer repudiate the communication with the sender once the receiver has been supplied a decrypted version of the decryption key.

According to an embodiment, at 131, the secure device service may decrypt the key using its private key and a public key of the sender, which can be obtained from the previously exchanged certificates with the sender. In other cases, a session key may be used to decrypt the key as well.

At 140, the secure device service records a decryption date and time that the encrypted key was decrypted for the receiver. So, if a receiver attempts to subsequently repudiate the communication with the sender the record keeping of the secure device service will provide the records to either deny the assertion of the receiver of affirm the assertions of the receiver.

If a man-in-the-middle attack was used on the receiver's end of the communication, such that the encrypted key was never received by the receiver, then the receiver can use the records of the secure device service to prove that such was the case. However, if the receiver did receive the key in a decrypted format than the receiver cannot repudiate the communication with the sender, since the records establishing this fact will exist with the secure device service as well.

According to an embodiment, at 141, the secure device service may report the exchange and decryption dates and times to authorized requestors. That is, a requesting sender may via authorization from a receiver directly interact with the secure device service and establish for itself whether the receiver did or did not receive the key in a decrypted format. Pursuant to agreements between the receiver and the sender, the secure device service may interact remotely over a network with the sender for purposes of an audit; or alternatively, the device upon which the secure device service processes may be physically shipped to the sender for subsequent auditing.

In an embodiment, at 150, the secure device service may simultaneously support other additional receivers and their communications with other senders at the same time it assist the receiver and its communication with its sender. That is, the device and the secure device service may be threaded and may permit parallel processing. In other cases, the secure device service may permit just a single receiver at a time or the secure device service may be specific to a specific receiver.

One now appreciates how a secure device service may be installed and processed on a device or machine within a local environment of a receiver and facilitates communications between a sender and a receiver. This facilitation keeps records and provides decryption services to the receiver and may assist the receiver in proving a communication was not completed or it may assist a sender in proving a communication was in fact successfully completed.

Figure 2:
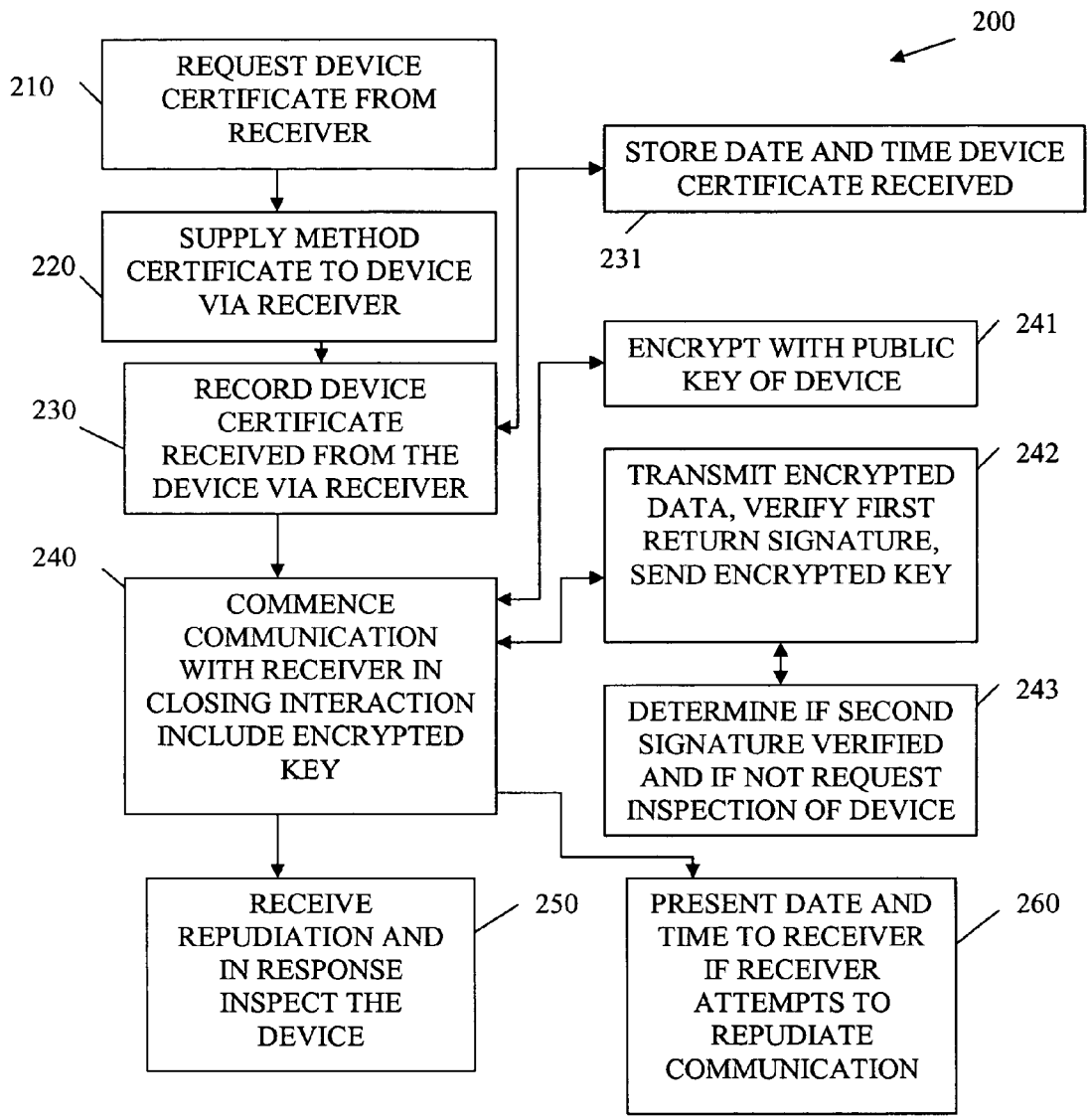
FIG. 2 is a diagram of method for a sender's interactions with a secure device that facilitates receiver non-repudiation in a communication between the sender and a receiver, according to an example embodiment.

FIG. 2 is a diagram of method 200 for a sender's interactions with a secure device that facilitates receiver non-repudiation in a communication between the sender and a receiver, according to an example embodiment. The method 200 (hereinafter "sender service") is implemented in a machine-accessible and readable medium and is accessible over a network. The network may be wired, wireless, or a combination of wired and wireless.

The sender service represents interactions from the perspective of a sender in a receiver-sender communication. The sender service communicates indirectly with a secure device service processing within a local environment of the receiver. An example of a secure device service was presented above with respect to the method 100 of the FIG. 1.

Initially, a sender associated with the sender service determines that a communication or transaction is necessary with a receiver. Accordingly and before that communication commences, at 210, the sender service makes a request for a secure device certificate from the receiver. In response to the request, the receiver obtains and provides the secure device's certificate to the sender service.

At 220, the sender service supplies to the secure device a certificate associated with the sender service. Again, the certificate of the sender service is supplied to the receiver and the receiver communicates the sender service's certificate to the secure device. It is also noted that the certificate request and submission may occur in a same request or interaction or may occur in any processing order. Thus, the order depicted in FIG. 2 is presented for purposes of illustration only and should not limit the teachings presented herein.

At 230, the sender service records or registers the device certificate that is received from the receiver. Furthermore, at 231, the date and time that the device certificate was received may also be recorded or logged. Registration of the secure device's certificate and the date and time in which it was received may assist the sender service in establishing proof that communication with the secure device was properly established via the receiver and that a certificate was obtained. This may prove useful if the receiver subsequently attempts to repudiate the communication with the sender service, since the sender service can produce the certificate of the secure device and can produce a date and time for which the certificate was acquired.

At 240 and after certificates are exchanged between the sender service and the secure device of the receiver, the sender service commences a communication with the receiver. During a closing interaction of that communication, the sender service includes an encrypted version of a decryption key. When the decryption key is decrypted and supplied to the receiver, the receiver is no longer in a position to repudiate the communication with the sender, since the receiver has all information necessary to successfully conclude the communication at that point in time.

In an embodiment, at 241, the decryption key may be encrypted with a public key of the secure device. The secure device's certificate may supply the public key of the secure device and the certificate was requested and acquired before the communication commenced.

According to an embodiment, at 242, during the communication the sender service first transmits encrypted data that is encrypted with the decryption key. The receiver sends back a verifying signature for the encrypted data and in response to validating the signature, the sender service sends an encrypted version of the decryption key to the receiver. At this point, the receiver requested that the encrypted key be decrypted by the secure device and if this does occur, the receiver sends back to the sender service a second verifying signature. Thus, at 243, the sender service then determines if the second signature is validated or verified, and if the second signature is not verified, the sender service may request that the receiver provide the secure device for inspection.

For example, at 250, if the receiver fails to send a second verifying signature or sends an incorrect signature for the encrypted key that is sent by the sender service at the conclusion of the communication with the receiver, then, the receiver maybe deemed to be attempting to repudiate the communication.

In such a scenario and pursuant to prior agreements between the sender and receiver, the sender service may request the secure device for inspection. During inspection, the sender service may acquire the date and time that the sender service and the secure device exchanged certificates and determine if the requestor ever presented the encrypted key for decryption to the secure device. If the encrypted key was in fact presented then the receiver may not repudiate the communication, if the encryption key was never presented that pursuant to agreements the receiver and sender may agree that the receiver did in fact encounter a problem where repudiation is appropriate and is warranted.

In an embodiment, at 260, if a dispute arises between the receiver and the sender, the sender service may present the date and time that the sender service recorded the secure device's certificate. Thus, a baseline beginning time for a communication may be established with this date and time and the fact that the sender service did in fact acquire the certificate of the secure device may be established.

The processing of the method 100 depicts a secure device service that directly interacts with a receiver within the receiver's local environment and the processing of the method 200 depicts a sender service that indirectly communicates with the secure device service by directly interacting with the receiver. The sender service and the receiver engage in a communication and the secure device service acts as a secure and tamper resistant third party resource, which is directly accessible to the receiver from the receiver's local environment. A communication is tracked by the secure device service and decryption services are supplied to the receiver via the secure device service. This arrangement and interaction permits a more reliable determination as to whether receiver repudiation in a communication is appropriate or not appropriate.

Figure 3:
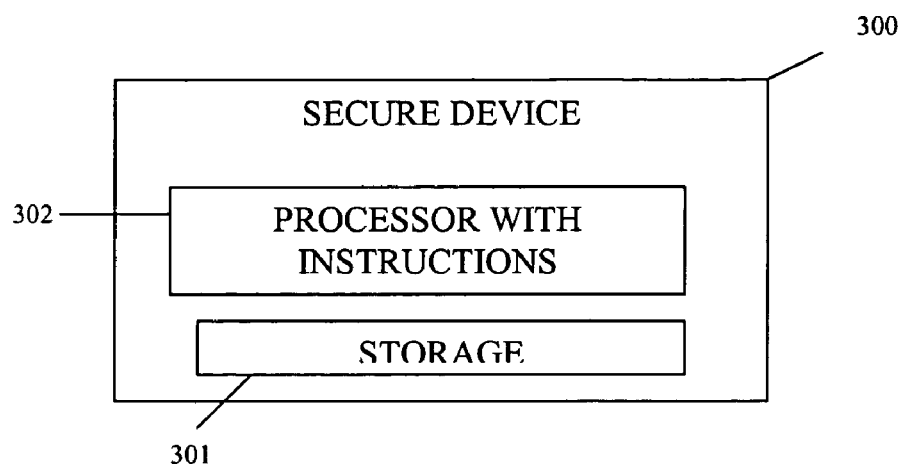
FIG. 3 is a diagram of a secure device apparatus, according to an example embodiment.

FIG. 3 is a diagram of a secure device apparatus 300, according to an example embodiment. The secure device apparatus 300 is implemented in a machine-accessible and readable medium and is accessible over a network. The network may be wired, wireless, or a combination of wired and wireless. In an embodiment, the secure device apparatus 300 implements, among other things, various aspects of the methods 100 of the FIG. 1.

The secure device apparatus 300 is a secure device 300 or a machine that includes storage 301 and a processor with instructions 302 (herein after instructions 302). The secure device 300 is tamper resistant and in some cases may be disposable. According to an embodiment, the secure device 300 is a removable and hot pluggable USB device.

The storage 301 maybe include volatile and/or non volatile memory or fixed storage. The storage 301 includes a variety of information, such as a certificate for the secure device 300 a private key for the secure device 300 and other information acquired during the operation of the secure device 300. Some of that other information may include certificates of senders or sender services, certificates of receivers, encrypted versions of decryption keys used in communications between senders and receivers, and other log or metric data. Some examples of log and metric data may include, but is not limited to dates and times for when certificates were received from senders, dates and times for when receivers requested a decrypted version of encrypted decryption keys, and the like.

According to an embodiment, the storage 301 is prefabricated with a private key from the manufacturer and only an administrator having that private key may perform volatile operations on the storage 301, such as writes and deletes.

The storage 301 also includes read or non volatile access to authorized requestors. A receiver may be an authorized requestor having a password to access the storage 301. In some cases, the receiver may also create other authorized user accounts, such as for senders so that senders may inspect the storage 301 for non volatile operations (e.g., reads).

The instructions 302 when processed perform a variety of operations. Examples of some operations were presented above with respect to the secure device service represented by the method 100 of the FIG. 1. The instructions 302 when processed permit senders to exchange certificates with the certificate of the secure device 300 that resides in its storage 301.

The instructions 302 also record dates and times that certificates were exchanged with senders and perform decryption services for receivers. The receivers present encrypted versions of decryption keys to the secure device 300 via the instructions 302. In response, the instructions 302 decrypt the encrypted keys, provided the decrypted keys to the receivers, and record the date and time the decrypted keys were supplied to the receivers.

During a communication between a sender and receiver if something goes awry, an authorized requestor may audit with a non volatile read operation the storage 301 of the secure device 300. During the audit the recorded dates and times are acquired for receipt of certificates and for delivery of decryption keys. This information may be used to establish a legitimate repudiate or to establish that the receiver cannot repudiate a communication.

In some embodiments, at least some information housed within the storage 301 may be stored in an encrypted format. For example, the dates and times may be encrypted using a public key of the receiver. Moreover, communications between the secure device 300 and the receiver may be encrypted for added security.

The secure device 300 is interfaced to a local environment of a receiver. It may be a fixed device or a portable device within that environment. It may be affixed to a machine or the receiver or to a server or proxy machine associated with a local networked environment of the receiver. Additionally, the secure device 300 may service a single and specific receiver or may service a plurality of different receivers. Still further, the instructions 302 may, in some cases, be threaded, such that the instructions 302 simultaneously service multiple concurrent receivers associated with multiple different communications with different or same senders.

Figure 4:
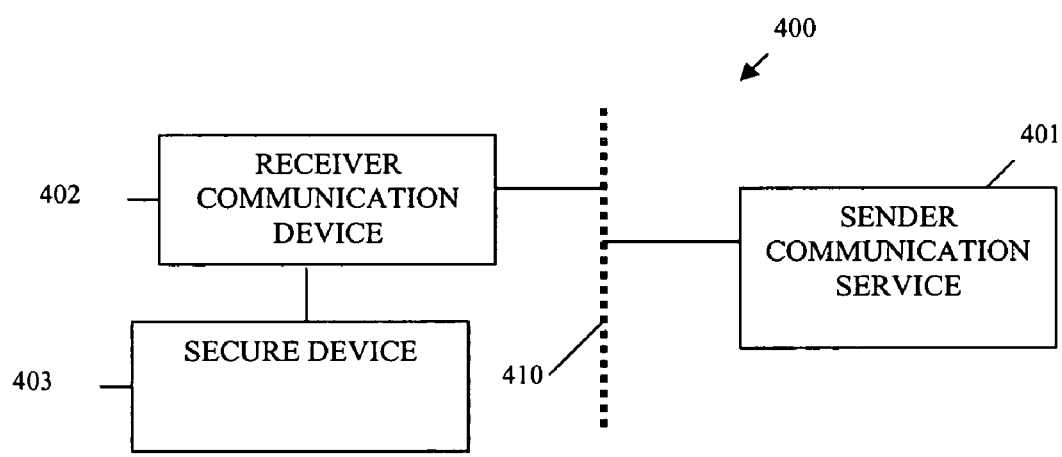
FIG. 4 is a diagram of non-repudiation system, according to an example embodiment.

FIG. 4 is a diagram of non-repudiation system 400, according to an example embodiment. The non-repudiation system 400 is implemented in a machine-accessible and readable medium is accessible over a network. The network may be wired, wireless, or a combination of wired and wireless.

In an embodiment, the non-repudiation system 400 represents the processing of the secure device service represented by the method 100 of the FIG. 1 processing as the instructions 302 on the secure device 300 of the FIG. 3 and represents the processing of the sender service represented by the method 200 of the FIG. 2.

The non-repudiation system 400 includes a sender communication service 401, a receiver communication service 402, and a secure device 403. These components communicate over a network 410. Each of these will now be discussed in turn.

The sender communication service 401 is designed to engage in communications with a receiver via the receiver communication service 402. The sender communication service 401 also indirectly communicates with the secure device 403 through the receiver communication service 402. Examples of processing associated with the sender communication service 401 were presented above with the sender service represented by the method 200 of the FIG. 2.

Essentially, the sender communication service 401 exchanges certificates with the secure device 403 via the receiver communication service 402. Next, the sender communication service 401 engages in a communication with a receiver over the network 410 via the receiver communication service 402. During this communication at least two transmissions are sent from the sender communication service 401 to the receiver communication service 402 and under normal circumstances the sender communication service 401 expects to receive back two acknowledgement transmissions from the receiver communication service 402.

In a first transmission, after the certificates were exchanged, the sender communication service 401 encrypts data with a key and transmits the encrypted data to the receiver communication service 402. In response, the sender communication service 401 expects a verifying signature to acknowledge receipt of the encrypted data from the receiver communication service 402. Assuming that this was the case, the sender communication service 401 then sends in a second transmission and encrypted version of a decryption key that the receiver communication service 402 may use to decrypt the previously sent and acknowledged encrypted data. In response, the sender communication service 401 expects another verifying signature to acknowledge receipt of the encrypted key from the receiver communication service 402. Assuming this occurs, then the communication is successful and the receiver cannot repudiate the communication.

If a second signature is now received as an acknowledgement or if it is received but incorrect, then the sender communication service 401 may request to inspect the secure device 403 to audit dates and times and to see if the receiver did in fact present the encrypted key to the secure device 403 for decryption. If this was the case, then the receiver may not repudiate the communication. However, if the receiver never presented the encrypted key to the secure device 403 for decryption, then the sender communication service 401 may assume a legitimate problem was encountered and may obviate the receiver for the communication; essentially permitting the receiver to repudiate the communication.

The receiver communication service 402 interacts with the sender communication service 401 and the secure device 403. The receiver communication service 402 facilitates exchanging certificates between the secure device 403 and the sender communication service 401. In an embodiment, the receiver communication service 402 may also exchange certificates with the secure device 403. The receiver communication service 402 also attempts to acknowledge transmissions received from the sender communication service 401 pursuant to any policy as to how acknowledgements are to be formed and sent. Moreover, when the sender communication service 401 sends an encrypted version of a decryption key, the receiver communication service 402 presents this encrypted key to the secure device 403 for decryption.

The secure device 403 operates securely within the environment of the receiver communication service 402. The secure device 403 exchanges certificates with the sender communication service 401 and perhaps, if desired, the receiver communication service 402. The secure device also decrypts encrypted keys presented by the receiver communication service 402 and logs or records dates and times associated with decryption and associated with exchanging certificates.

Examples of processing associated with the secure device 403 were presented above with the secure device service represented by the method 100 of the FIG. 1 and the instructions 302 of the secure device 300 of the FIG. 3. The secure device 403 is tamper resistant and severely restricts volatile operations to its memory/storage. Non volatile access is provided to authenticated and/or registered requesters.

If problems occur with a communication between a sender communication service 401 and a receiver communication service 402, the secure device 403 may be consulted and audited to determine if there were legitimate problems, such that repudiation is appropriate, or to determine if it there where not legitimate problems, such that non-repudiation is appropriate.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. § 1.72 (b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A device-implemented method to execute on a secure device, comprising:

exchanging, by the secure device, certificates with a sender via a receiver, the sender and the receiver are to engage in a communication with one another, the sender certificate includes a public key of the sender and the secure device certificate includes a public key of the secure device;

recording, by the secure device, an exchange date and time the exchange took place with the sender in an encrypted format using a private key of the secure device;

supplying, by the secure device, a decrypted version of an encrypted key to the receiver, when the receiver presents the encrypted key, the receiver makes a specific request of the secure device via the encrypted key, and the receiver uses the decrypted version to complete the communication by decrypting data that had been encrypted within the communication, the secure device is a tamper resistant device that is prefabricated with the private key that when provided provides administrative access to the secure device, the secure device is situated within a local environment to the receiver; and interacting, by the secure device, with the sender permitting the sender to perform an audit to establish that the receiver did receive the decrypted version of the encrypted key from the secure device.

2. The method of claim 1 further comprising, recording, by the secure device, a decryption date and time that the decrypted version of the encrypted key was supplied to the receiver, if the receiver had presented the encrypted key.

3. The method of claim 2 further comprising, reporting, by the secure device, at least one of the exchange date and time and the decryption date and time to an authorized requestor.

4. The method of claim 1 further comprising, authenticating, by the secure device, the receiver for access before processing the method.

5. The method of claim 1 further comprising, encrypting, by the secure device, the exchange date and time with a public key of the receiver.

6. The method of claim 1 further comprising, simultaneously supporting, by the secure device, other additional receivers and their communications with other senders at a same time that the receiver and its communication with the sender is being processed.

7. The method of claim 1, wherein supplying further includes, decrypting the encrypted key with a private key associated with the method and a public key associated with the sender, if the encrypted key is presented by the receiver.

8. A method, comprising:
   requesting a device certificate that is received from a receiver, the device certificate is associated with a secure device residing in the environment of the receiver, the secure device is a tamper resistant device prefabricated with a private key that when provided provides administrative access to the secure device, the secure device is interfaced to the local networked environment of the receiver;
   supplying a certificate of the method to the secure device via the receiver, that certificate including a public key of the method;
   recording the device certificate that was received from the receiver, the device certificate received from the receiver and indirectly from the secure device, the device certificate including a public key of the secure device;
   commencing a communication with the receiver, a closing interaction includes an encrypted key, which when decrypted by the secure device provides a key to decrypt encrypted data included with the communication, the encrypted key supplied to the receiver and the receiver presents the encrypted key as a request to the secure device for decryption; and
   interacting with the secure device to establish that the receiver received a decrypted version of the encrypted key from the secure device.

9. The method of claim 8 further comprising:
   receiving a repudiation from the receiver; and
   inspecting the secure device to determine if a decrypted version of the encrypted key was supplied by the secure device to the receiver, and if so disputing the repudiation by the receiver.

10. The method of claim 8, wherein commencing further includes encrypting a decryption key to produce the encrypted key, wherein the decryption key is encrypted with the public key of the secure device acquired with the device certificate.

11. The method of claim 8, wherein recording further includes storing a date and time that the device certificate was received from the receiver.

12. The method of claim 11 further comprising, presenting the date and time to the receiver if the receiver attempts to repudiate the communication.

13. The method of claim 8, wherein commencing further includes:
   transmitting encrypted data, which is encrypted with a decrypted version of the encrypted key;
   verifying a first return signature from the receiver indicating the encrypted data was received by the receiver; and
   sending the encrypted key with the closing interaction.

14. The method of claim 13 further comprising:
   determining if a second return signature is received from the receiver and if so attempting to verify that signature, and if verified determining that the communication completed successfully; and
   determining if either the second return signature was not received or if the second return signature was not verified, and if this is the case, requesting inspection of the secure device from the receiver.

15. An apparatus, comprising:
   storage; and
   a processor having instructions to be processed thereon, the storage is to house certificates of one or more senders involved in communications with one or more receivers and is to house encryption keys associated with those communications, each certificate including a particular public key used by a particular sender, and the instructions when processed by the processor are to decrypt the encryption keys upon request of the one or more receivers and provide the decrypted versions to the receivers, the receivers directly interact with the apparatus and senders indirectly communicate with the apparatus via the receivers, the apparatus is tamper resistant and prefabricated with a private key that when provided provides administrative access to the apparatus, and the apparatus is to be interfaced to local networked environments of the one or more receivers and the apparatus to permit the senders to audit the apparatus to establish whether the receivers acquired the decrypted versions of the encryption keys from the apparatus, the receivers provide the encrypted keys to the apparatus as requests and in response the apparatus provides the decrypted versions of the encrypted keys back to the receivers.

16. The apparatus of claim 15, wherein the apparatus is a Universal Serial Bus (USB) device that is adapted to be interfaced to machines or servers associated with the one or more receivers.

17. The apparatus of claim 15, wherein the storage is at least one of volatile and non volatile memory.

18. The apparatus of claim 15, wherein the instructions are to record within the storage dates and times in which the decrypted versions of the encrypted keys are supplied to the one or more receivers.

19. The apparatus of claim 15, wherein the instructions are to record within the storage dates and times in which the certificates were received.

20. The apparatus of claim 19, wherein the instructions are to provide read access to the storage for authenticated requestors, and wherein the instructions are to provide read and write access to a manufacture administrator that supplies a private key, which was prefabricated within the storage of the apparatus.

21. A system, comprising:
   a sender communication service;
   a receiver communication service; and
   a secure device, the secure device is to be interfaced within a local environment of the receiver communication service and is to decrypt an encrypted key supplied to the secure device from the receiver communication service, the receiver communication service is to receive the encrypted key in a communication with the sender communication service and via a sender certificate that also includes a public key of the sender communication service, the secure device is tamper resistant and is prefabricated with a private key that when provided grants administrative access to the secure device and the secure device is to be interfaced to the local environment of the receiver that the receiver is locally networked to, and the secure device is to permit the sender communication service to audit the secure device to establish that the receiver communication service received a decrypted version of the encrypted key from the secure device, the receiver communication service presents the encrypted key to the secure device and in response the secure device provides back to the receiver communication server the decrypted version of the encrypted key.

22. The system of claim 21, wherein the secure device is to communicate with the sender communication service via the receiver communication service.

23. The system of claim 22, wherein the secure device is to exchange certificates with the sender communication service, and wherein the public key of the sender communication service and a private key of the secure device is to be used by the secure device to decrypt the encrypted key.

24. The system of claim 23, wherein the secure device is to supply a date and time to an authorized requestor.

25. The system of claim 21, wherein the secure device is to record a date and time that the decrypted key is supplied to the receiver communication service.

26. The system of claim 21, wherein the secure device is password protected.

27. The system of claim 21, wherein the secure device is portable and is removable from the local environment of the receiver communication service.

28. The system of claim 21, wherein the secure device is to support a plurality of additional instances of the receiver communication service, which are associated with different receivers.

29. The system of claim 21, wherein the secure device is to support a plurality of additional instances simultaneously or in parallel.

* * * * *